Patented June 2, 1953

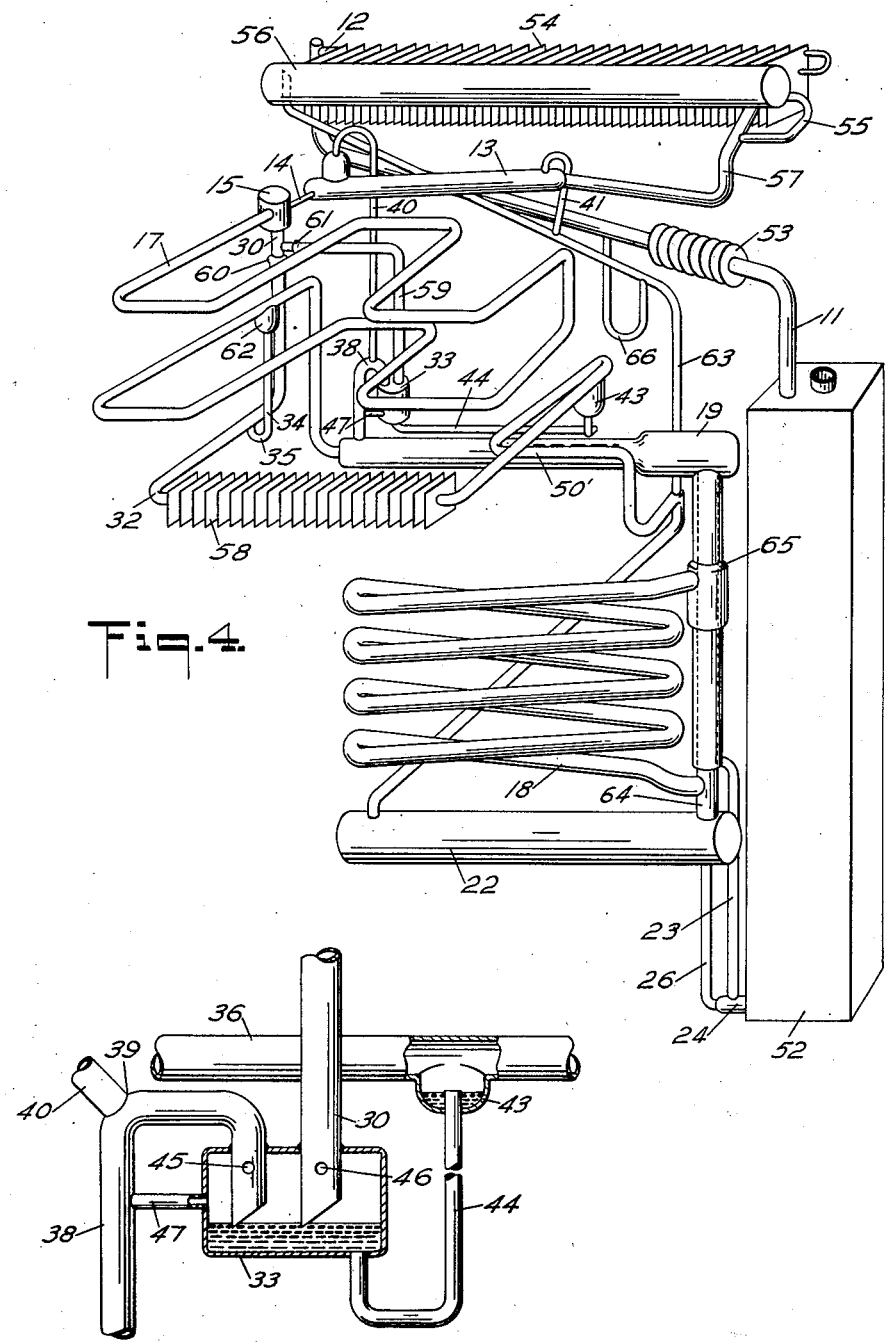

2,640,331

UNITED STATES PATENT OFFICE 2,640,331

ABSORPTION REFRIGERATION

Sigurd Mattias Bäckström, Stockholm, Sweden, assignor to Aktiebolaget Elektrolux, Stockholm, Sweden, a corporation of Sweden Application November 5, 1946, Serial No. 707,854
In Sweden November 8, 1945

18 Claims. (Cl. 62—119.5)

This invention relates to absorption refrigerating apparatus of the inert gas type, and is particularly concerned with cooling elements or evaporators having mutually thermally different temperature zones suitable for different refrigerating purposes. The object of the invention is to provide an improvement for maintaining substantially constant the temperature of a lower temperature zone independently of the variations of the working conditions in the other zones, whereby the lower temperature zone may then be used for freezing and protracted storage of easily damaged food.

It is already known to divert gas from different regions of evaporators adapted to operate with successively decreasing temperature along the path of flow of the gas, and also from different temperature zones to divert gas, the enriching of which in refrigerant in each zone corresponds to its temperature. The diverting of gas from the different zones is effected through openings in the evaporator wall, the number of which increases with decreasing temperature along the path of flow of the gas or decreases with increasing temperature along the path of flow of the gas, respectively. This arrangement is based upon the fact that, in order to obtain substantially constant refrigerating effect in the temperature range of each degree (which is suitable, since the produced refrigerating effect is used for cooling flow of gas), the necessary flow of gas, that is, the volume of gas passing over the liquid refrigerant, decreases with increase in temperature along the evaporator, and increases with decrease in temperature along the evaporator. In this known arrangement the temperature of the evaporator decreases continuously along the path of flow of gas. The invention, on the contrary, which relates to producing certain mutually different temperature zones with relatively constant temperature, is essentially characterized by the fact that the volume relation between gas quantities circulating through the parts is so regulated that the gas volume circulating through a deep-cooling section (low temperature evaporator) located, when counted from above, substantially between a precooling section (precooler) and a high temperature section (high temperature evaporator), is greater than the gas volumes which circulates through said precooling section and said high temperature section.

The invention will be further explained with reference to embodiments which are diagrammatically shown in the accompanying drawings, and in this connection further characteristic features of the invention will be set forth.

Fig. 1 diagrammatically illustrates an absorption refrigerating apparatus of the inert gas type embodying the invention which comprises a precooler, a low temperature evaporator, a high temperature evaporator and a regulating vessel for the gas circulation;

Fig. 3 shows the regulating vessel of Fig. 1 on a larger scale; and

Fig. 4 is a perspective view of a practical form of refrigeration apparatus embodying the invention which includes features present in the embodiment of Fig. 1. The directions of the gas circulation within the system are for the sake of clearness indicated by arrows in Figs. 1, 2 and 4.

The chosen embodiment is based on certain presumptions with reference to temperatures (° C.), pressure (atm.), refrigerating effects (kcal./h.) and circulating gas volumes (lit./h.) within the system. Thus, it is assumed that the refrigerating effect generated in the low temperature evaporator is 60 kcal./h. while the refrigerating effect in the high temperature evaporator is only 24 kcal./h. With a temperature of —25° C. in the low temperature evaporator and a temperature of 0° C. in the high temperature evaporator, this requires a gas circulation of 510 lit./h. through the former and 41 lit./h. through the latter. The precooling section, which has been presumed to deliver liquid refrigerant at a temperature of —20° C. requires in such a case a gas turn-over of 16 lit./h. The total pressure in the apparatus is according to the presumption about 25 atm.

Figure 1:
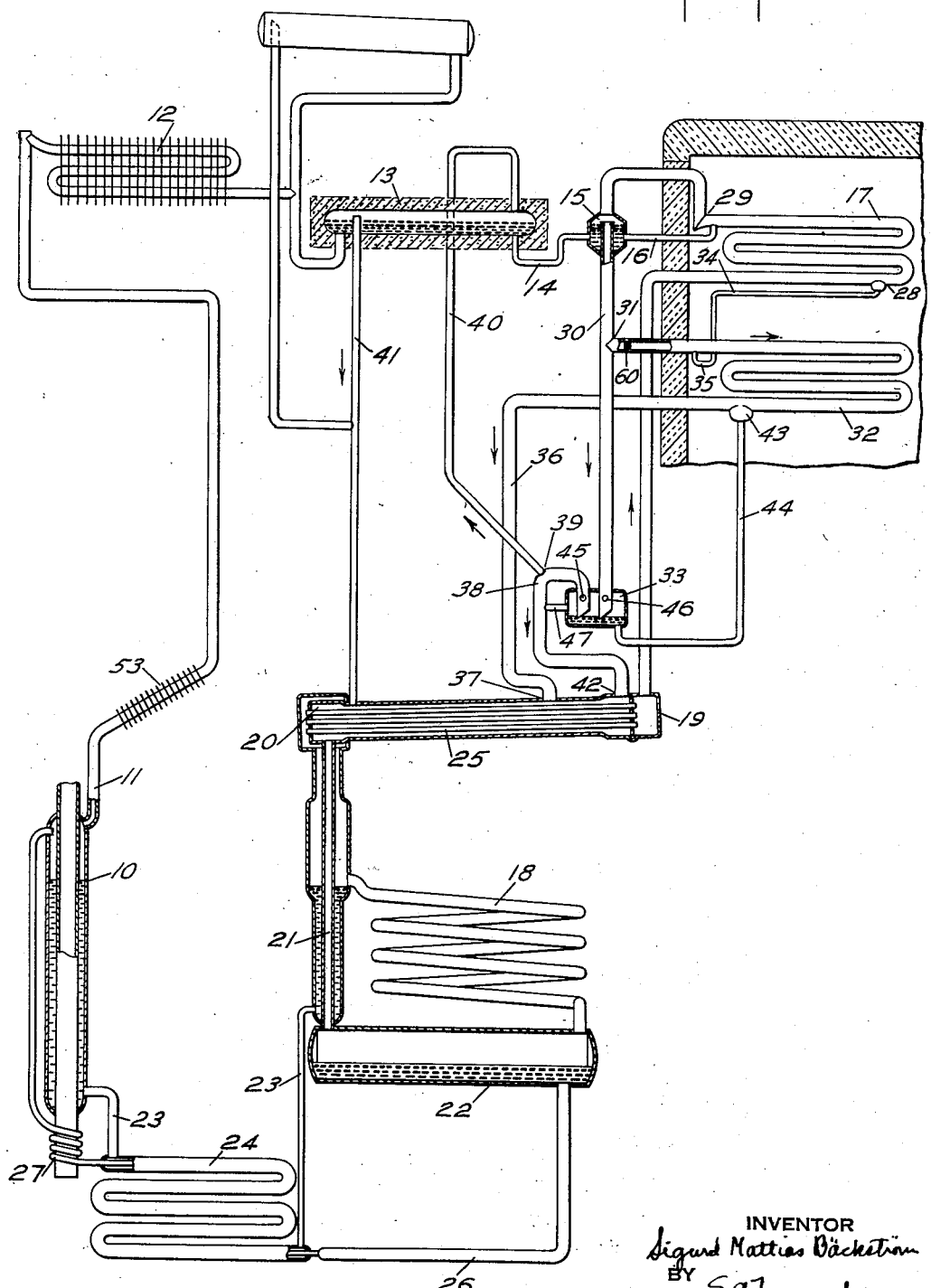

In Fig. 1 numeral 10 denotes a boiler containing a solution of a refrigerant in an absorbent preferably ammonia in water. By heating the liquid by a source of heat, not shown, refrigerant vapor is expelled. This vapor passes through a conduit 11 to the condenser 12 of the apparatus in which it is condensed, and from which the liquid refrigerant flows down to a precooling evaporator 13. In this evaporator the temperature of the liquid refrigerant, as mentioned, is decreased to about —20° C. before the refrigerant flows through a conduit 14, a vessel 15 and an overflow pipe 16 of the vessel into a low temperature evaporator 17 formed by a coil-shaped conduit in which evaporator the refrigerant is evaporated into weak inert gas, flowing in counter-flow to the refrigerant, thus producing refrigerating effect.

The weak inert gas flowing upwardly through the low temperature evaporator 17 and coming from the upper part of the absorber 18 of the apparatus is, before its entrance into the low temperature evaporator, cooled by cold rich inert gas flowing through the outer passage 20 of the gas heat exchanger 19 in counter-flow to the weak gas, such rich gas previously having been enriched in refrigerant in the different evaporators. After passing through the gas heat exchanger 19 the cold rich gas descends through a conduit 21 into an absorber vessel 22, in which the refrigerant is partially absorbed. Thereafter the gas rises through the absorber 18 suitably formed as a so-called coil absorber. During its upward flow the gas meets down-flowing absorbent which through a conduit 23, partially arranged as a liquid heat exchanger 24, is delivered to the absorber 18 from the bottom of the boiler 10. The gas is now released from refrigerant to a suitable degree of saturation before the gas flows to the low temperature evaporator 17 through the inner passage 25 of the gas heat exchanger 19.

The absorbent enriched in refrigerant in the absorber 18 is accumulated in the absorber vessel 22, from which the absorbent is conducted through a conduit 26, which is in heat exchange with absorbent weak in refrigerant flowing through the liquid heat exchanger 24, to the liquid circulating pump 27 which lifts the rich solution to a point located above the liquid level of the boiler.

The gas in the low temperature evaporator passes, as previously mentioned, in counter-flow to the ammonia flowing down through the conduit between a point 28 and a point 29 and is saturated with ammonia vapor which, at a presumed temperature of −25° C. in this evaporator in the resulting gas mixture, reaches a partial pressure of 1.5 atm. The gas enriched in ammonia then continues upwards past the point 29 and flows into the vessel 15, and the gas then passes downwardly into a conduit 30 communicating with such vessel.

The vessel 15, at the bottom of which the ammonia condensate from the precooling section 13 passes on its way to the low temperature section, thereby has an important task to fill. Especially when starting the apparatus it is necessary to regulate the gas circulation within the system so that the circulation will be in the correct direction. When the ammonia condensate begins to overflow from the precooling evaporator 13, it passes over the bottom of the vessel 15 in which part of the condensate evaporates into inert gas which is unsaturated in ammonia. The heavy gas mixture formed in this manner in the vessel 15 then begins to pass downwardly in the pipe 30. This starts a flow of gas in the coil 17 which is counter-current to the direction of flow of the ammonia at its entrance into said coil at the point 29.

At a point 31, located on the conduit 30, a high temperature evaporator 32 is connected, suitably also formed by a pipe coil. Gas flowing from the low temperature evaporator 17 through the vessel 15 and the conduit 30 at a partial pressure of 1.5 atm. is, at the connecting point 31, divided into two gas streams, one of which continues through the conduit 30 to a regulating vessel 33, and the other of which passes into the high temperature evaporator 32 in which the gas flow continues in concurrent relation to ammonia overflowing from the high temperature section 17 through a conduit 34 into the evaporator 32. The conduit 34 suitably is provided with a liquid trap 35 at its connection to the high temperature evaporator which prevents the gas in the low temperature section from flowing through other passages than those intended.

As the high temperature section 32 is supposed to operate at a temperature of about 0° C., the inert gas there can be enriched with ammonia vapor until the latter reaches a partial pressure of 4.3 atm. The gas at the entrance into the high temperature section 32 is at a temperature of about −25° C., and therefore its temperature must be raised to about 0° C. Thus the reason for dividing the gas mixture emerging from the low temperature evaporator 17 into two gas streams at the point 31 is evident, because it would be particularly unsuitable, after all of the gas mixture from the low temperature evaporator 17 is cooled to a temperature of −25° C., to raise the temperature of the entire volume of gas to 0° C. again. Accordingly, in Fig. 1 only a part of the gas mixture flowing from the low temperature evaporator and enriched in ammonia to a partial pressure of 1.5 atm. is conducted through the high temperature evaporator 32, the partial pressure of the ammonia in this gas mixture reaching a value of 4.3 atm. before the gas mixture passes through a conduit 36 and flows into the outer passage 20 of the gas heat exchanger at a point 37.

The point 37 at the exchanger is so chosen that its temperature is about the same as that of the entering gas mixture, namely, 0° C. In this manner the corresponding refrigerating effect is saved for the refrigeration requirements of the gas heat exchanger itself because, if the gas mixture were introduced in a colder portion of the exchanger 19, the temperature of such gas mixture would be raised at the cost of refrigerating effect which instead could be used for cooling the weak inert gas flowing through the inner passage 25 of the exchanger.

The gas enriched in refrigerant to a partial pressure of 1.5 atm., which flows into the regulating vessel 33 through the conduit 30, again flows out of the vessel through a conduit 38. At a point 39 on this conduit the gas flow is again divided, whereby one gas flow is conducted through a conduit 40 to the precooling evaporator 13 within which the gas passes in counter-flow to the ammonia condensate from the condenser to raise its partial pressure of ammonia from 1.5 atm. to 10 atm. The required heat for vaporizing ammonia is taken from the condensate which thus is cooled to about −20° C. After the gas mixture is enriched in the precooling section 13, it is conducted through a conduit 41 into the gas heat exchanger 19 at a point so chosen that its temperature corresponds to the temperature of the entering gas mixture.

The other subdivided stream formed at the point 39 continues through the conduit 38 to the gas heat exchanger 19, into which it enters at a point 42 at a partial pressure of ammonia of about 1.5 atm. and at a temperature of about −20° C. Such gas mixture at a partial pressure of 1.5 atm. and the gas mixture at a partial pressure of 4.3 atm. from the high temperature evaporator 31 are mixed in the exchanger about at the point 37. The mixture will have a partial pressure of 1.7 atm., which is then raised to 1.9 atm. by the gas mixture from the precooling evaporator which flows into the exchanger 19 and is enriched to 10 atm.

In order to automatically control the flow of gas within the system the above mentioned regulating vessel 33 shown in Figs. 1 and 3 is provided in the apparatus. If the rate of gas flow in the high temperature section 32 for any reason should become too small, unvaporized ammonia soon will pass down into the lowest coil of such evaporator, where it accumulates in a well 43 and from which the ammonia passes through a U-shaped conduit 44 and enters the bottom of said regulating vessel 33. A greater or smaller quantity of ammonia will gradually be accumulated in this vessel. If this quantity of ammonia becomes great, a blocking of the two openings of the conduits 30 and 38 will occur, which in the arrangement of Fig. 1 occurs successively because said ends of the conduits at their openings into the vessel are cut obliquely. When the ends are wholly blocked, however, a small quantity of gas can pass through holes 45 and 46 formed in the ends of the conduits. All of the remaining gas mixture from the low temperature evaporator section 17, however, can pass through the high temperature evaporator 32.

When the rate of gas flow through the high temperature evaporator 32 necessarily is increased by the liquid restriction in the regulating vessel 33, all ammonia in that evaporator section will soon be vaporized and the further supply of ammonia to the vessel 33 stops. The ammonia already present in the regulating vessel 33 evaporates then relatively quickly into the gas mixture passing through the holes 46 and 45, whereby the two lower ends of the conduits 30 and 38 successively become open so that the normal movement of gas gradually starts again.

In order to avoid the risk of accumulating water in the regulating vessel, the vessel desirably is provided with an overflow pipe 47, as shown in Fig. 3, interconnecting the conduit 38 and the regulating vessel 33.

Figure 2:
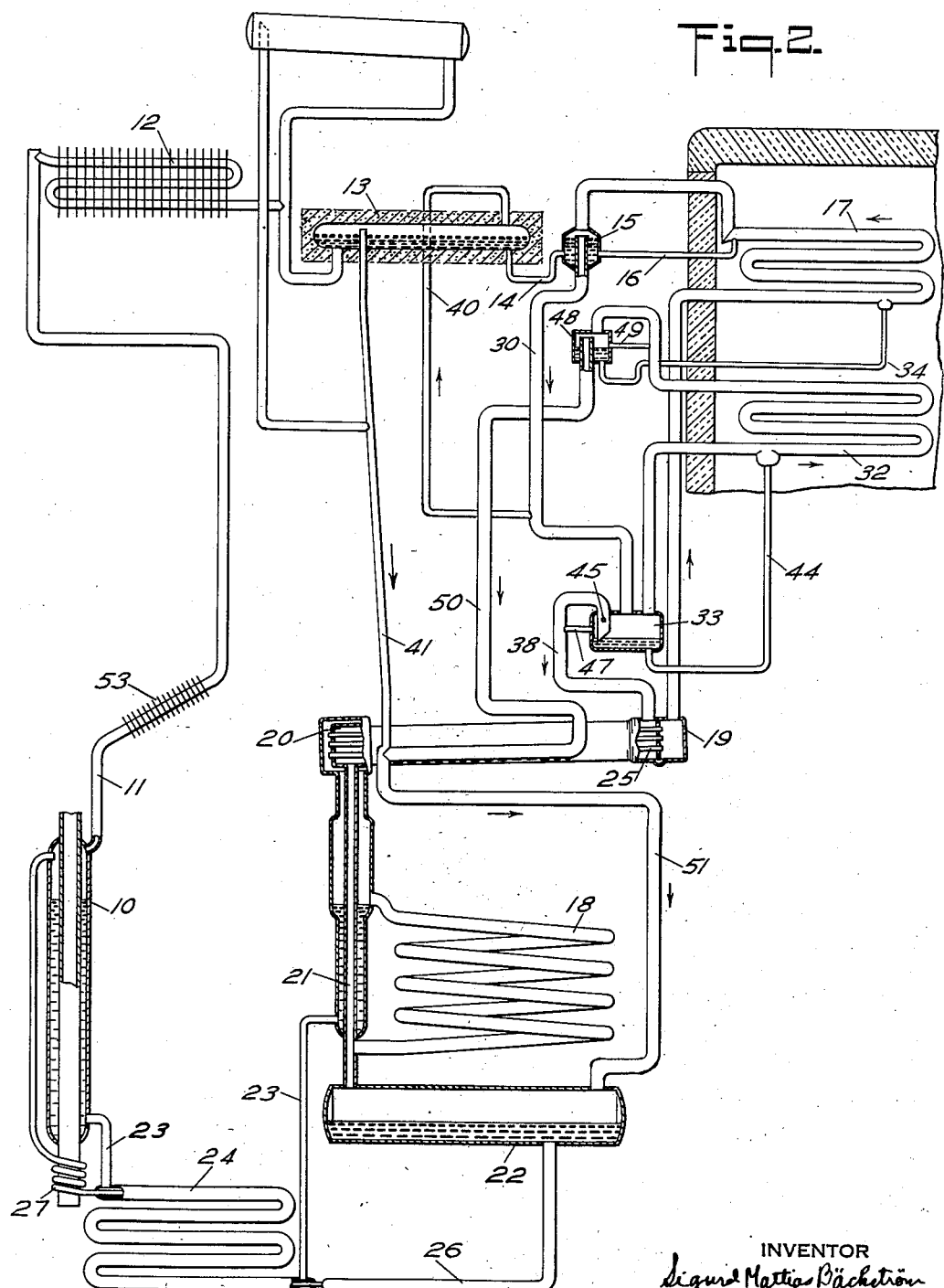
Fig. 2 shows a modification of the embodiment of Fig. 1.

In Fig. 2, which to a large extent corresponds to Fig. 1, the counter-flow principle is applied to the high temperature evaporator as well as to the low temperature evaporator. The high temperature evaporator 32 at its upper section is provided with a vessel 48 having the same function as the corresponding vessel 15 in the low temperature evaporator 17. Through the condensate conduit 34, which communicates with the low temperature evaporator 17, condensate overflows to the bottom of the vessel 48 and thence passes through an over-flow pipe 49 into the high temperature section 32, in which the condensate flows in counterflow to the gas mixture passing through this section. Such gas mixture is supplied from the low temperature evaporator 17 through the conduit 30 and the regulating vessel 33. The partial pressure of the ammonia of this supplied gas mixture is 1.5 atm. as in the embodiment of Fig. 1.

In Fig. 2 the regulating vessel 33, as above mentioned, differs somewhat from the corresponding vessel 33 in Fig. 1. Thus, when the liquid level rises in the vessel 33 of Fig. 2, only the conduit 38 connected to the gas heat exchanger 19 is blocked. Free communication is maintained for the gas mixture which flows from the low temperature section 17 to the high temperature section 32, the regulating vessel 33 forming a part of the path of gas flow. When compared with the arrangement in Fig. 1, the end of the conduit 40 in Fig. 2, leading to the deep cooling evaporator, has been shifted from the conduit 38 to the conduit 30. If ammonia overflows through conduit 44 to the regulating vessel 33 to block the conduit 38, the gas volume forced to flow through the high temperature section 32 is higher and takes place at a rate considerably greater than when the pipe 38 is open. When this occurs all of the ammonia in the high temperature section vaporizes. This causes the seal in the vessel 33 to open because the ammonia in the vessel evaporates in the insignificant gas flow, the gas continuously passing through the hole 45 into the conduit 38.

In accordance with Fig. 1 two gas streams are mixed at the connection of conduit 36 to the gas heat exchanger 19, such conduit being connected to the high temperature evaporator 32. The gas stream flowing from the low temperature section 17 is at a partial refrigerant pressure of 1.5 atm., and the other stream flowing from the high temperature evaporator 32 is at a partial refrigerant pressure of 4.3 atm. The partial refrigerant pressure of the mixture becomes 1.7 atm. which thereafter is further raised to 1.9 atm. in the exchanger at the connection thereto of the conduit 41 communicating with the precooling evaporator 13. This increase in the partial refrigerant pressure constitutes an inconvenience as the gas in the originally undivided stream leaving the low temperature section 17 is at a partial refrigerant pressure of only 1.5 atm. As this gas stream is the larger one, the absorber has to work on the entire quantity of gas circulating within the system at a high partial refrigerant pressure of 1.9 atm.

In Fig. 2 the gas at a partial refrigerant pressure of 4.3 atm. flowing from the high temperature evaporator through a conduit 50 thermally connected to the gas heat exchanger, is not allowed to mix with the gas from the low temperature evaporator 17, but instead mixes with the gas at a partial refrigerant pressure of 10 atm. flowing in the conduit 41, in order thereafter to flow together in a conduit 51 to the absorber vessel 22, the absorbing surface of which is sufficiently large to decrease the partial refrigerant pressure of the gas mixture from 6 atm. to about 1.5 atm.

In this case only one of the gas streams from the evaporators passes through the gas heat exchanger 19. After the gas has passed through the gas heat exchanger, it flows through the conduit 21 to the lowest coil of the absorber 18. In this coil the gas mixture meets the gas coming from the absorber vessel, such gas having been released from ammonia to a partial refrigerant pressure of 1.5 atm., and these two gas mixtures rise together through the absorber coil 18, in which further absorption of ammonia occurs.

In Fig. 4 numeral 52 denotes a heat insulated expulsion unit which is constructed in accordance with the boiler unit diagrammatically shown in Fig. 1. Ammonia vapour flows from the boiler through the vapour conduit 11 and the rectifier 53 to the condenser 12, the rectifier being provided with surface increasing members in the shape of fins or the like. Furthermore, there is a so-called pressure equalizing vessel 56 attached to the condenser 12 by means of a conduit 55, the operation of which is known. Through a conduit 57 and a conduit 55 ammonia condensate is conveyed to the precooling section 13, in which the temperature of the condensate is decreased before it flows into the low temperature section 17 through the conduit 14 and the vessel 15 mentioned in connection with Figs. 1 and 2. In the low temperature section 17 vaporization of the condensate takes place into the inert gas flowing through such section in counterflow to the condensate, whereby the inert gas is enriched in refrigerant. The enriched gas, the partial refrigerant pressure of which in accordance with the description of Figs. 1 and 2 reaches a pressure of 1.5 atm., flows through the conduit 30 to the high temperature section 32, provided with fins 58. To the conduit 30 is connected a conduit 59, and these two conduits at a small distance from the connecting point are provided with flow restrictors 60 and 61, the restrictor 60 also being shown in Fig. 1. By means of the flow restrictors 60 and 61 the gas stream coming from the low temperature section 17 through the vessel 15 is divided into two volumetrically balanced gas streams, one of which passes through a conduit 59 to the regulating vessel 33 described in connection with Figs. 1–3, and the other of which passes into the high temperature section 32 through the conduit 30. The latter gas stream then passes through the high temperature evaporator 32 in parallel flow with ammonia and evaporates in such ammonia which overflows from the low temperature evaporator 17 through a well 62, the conduit 34 and the liquid seal 35. The gas mixture thus formed, the partial ammonia pressure of which reaches 4.3 atm. and possibly unevaporated ammonia as well as possibly existing water, flows to the well 43, in which the liquid flows down while the gas mixture flows further to the conduit 50 thermally connected to the gas heat exchanger 19. The liquid overflowing to the well 43 flows further through the conduit 44 and enters the regulating vessel 33 provided with the over-flow pipe 47. When the gas mixture has passed through the conduit 50, the gas mixture also flows through a conduit 63, the primary object of which is to ventilate the pressure vessel 56, and thereafter enters the absorber vessel 22. During the flow of the gas along the absorber surface in vessel 22 the partial pressure of the ammonia in the gas is decreased to about 1.5 atm. before the gas rises through a conduit 64.

The gas stream which is introduced into the regulating vessel 33, leaves this vessel through the conduit 38, and flows through the gas heat exchanger 19 and downwardly in the conduit 64. In the lower section of the conduit 64 the gas streams separated at 60 and 61 come together again to form a single gas stream which flows into the absorber for the absorption solution to absorb refrigerant from the gas mixture. When the gas stream has passed through the absorber, it flows to the gas heat exchanger 19 through an outer passage 65 arranged around the conduit 64, the lower section of such outer passage being arranged as a stand pipe for weak absorbent passing from the boiler of the apparatus through the conduit 23. The gas thereafter in known manner passes through the exchanger 19 and flows back into the low temperature evaporator 17.

In order to precool the ammonia condensate in the precooling section 13 part of the gas flowing from the regulating vessel 33 through the conduit 38 is diverted through the conduit 40. This gas flows through the precooling section and a certain part of the ammonia therein is evaporated into the gas which, upon entering, is enriched in ammonia to a partial pressure of 1.5 atm. In the precooling section 13 the gas is enriched in ammonia to a partial pressure of 10 atm. and the condensate is successively cooled to about —20° C. The enriched gas thereafter leaves the precooling evaporator 13 through the conduit 41 and enters into the vent pipe 63 in which it mixes with the gas flowing therein from the high temperature evaporator. The gas mixture thus attains a partial ammonia pressure of 6 atm. before its entrance into the absorber vessel 22. In this connection it has been found valuable to take out condensate from the colder sections of the rectifier 53 and, as is clear from Fig. 4, to draw off this condensate by means of a U-shaped pipe 66 through the vent pipe 63 into the absorber vessel 22.

Concerning the operation of the regulating vessel 33 included in the apparatus it is above fully described in connection with Figs. 1 and 3, but it is to be noted that this vessel should be located below the evaporators. Further, in each embodiment the regulator 33 essentially constitutes a valve means in which the liquid body therein essentially serves as a movable part which, upon rise and fall in the vessel, acts to change the rate at which inert gas flows through the high temperature evaporator 32. When the quantity of unevaporated refrigerant fluid passing from the evaporator sections increases and the liquid level in the regulator 33 rises, the rate at which inert gas flows through the evaporator section 32 also increases. Conversely, when the quantity of unevaporated refrigerant fluid passing from the evaporator sections decreases and the liquid level in the regulator 33 falls due to evaporation of fluid into inert gas in the latter place, the rate at which inert gas passes through the evaporator section 33 decreases.

The invention also renders it possible to improve considerably the heat exchange effected between inert gas flowing to and from the evaporators which are weak and rich in refrigerant, respectively. Thus it is possible to utilize the gas from the low temperature evaporator and entering the gas heat exchanger at a temperature of —25° C., for example, to cool the weak inert gas flowing through the inner passage of the gas heat exchanger to such evaporator to at least —20° C. If, on the other hand, the entire quantity of gas from the low temperature section were passed through the high temperature evaporator, the temperature of the gas would then be raised to about 0° C., that is, the temperature of the high temperature evaporator. In such case the gas flowing through the gas heat exchanger 19 to the low temperature section 17 could not be cooled to a temperature below about +5° C.

The invention is not to be limited to the embodiments shown and described but can be varied without departing from the spirit and scope of the invention, as pointed out in the following claims.

I claim:

1. Absorption refrigeration apparatus employing evaporation of refrigerant fluid in the presence of inert gas including a circuit for circulation of such gas comprising an upper, intermediate and lower cooling elements in which said evaporation may take place, connections for conducting refrigerant fluid by gravity flow from said upper cooling element to said intermediate cooling element and from the latter to said lower cooling element, said refrigerant fluid connections each having a liquid trap to prevent flow of inert gas therethrough, each of said cooling elements having a single place at which inert gas is introduced and a single place at which inert gas passes therefrom and being connected in said circuit for flow of inert gas through said intermediate cooling element and from the latter through said lower and upper cooling elements so that evaporation of refrigerant fluid takes place at a low temperature in said intermediate cooling element and at higher temperatures in said lower and upper cooling elements, and means including connections for effecting circulation of inert gas through said intermediate cooling element at a rate which is always greater than that at which circulation of inert gas is effected through said lower and upper cooling elements, said last-mentioned means including provisions for subdividing the inert gas passing from said intermediate cooling element into a plurality of gas streams of which one flows through said lower cooling element.

2. Refrigeration apparatus employing evaporation of refrigerant fluid in the presence of an inert gas which includes an inert gas circuit having low and higher temperature evaporators in which said evaporation may take place and through which inert gas flows serially so that evaporation of fluid takes place at a higher temperature in said higher temperature evaporator than in said low temperature evaporator, said low temperature evaporator being at one level and said higher temperature evaporator being at a lower level, means for conducting liquid refrigerant successively through said low and higher temperature evaporators, respectively, and structure including valve means embodied in said gas circuit for regulating the circulation of inert gas through said higher temperature evaporator relative to the circulation of inert gas through said low temperature evaporator responsive to change in load on said higher temperature evaporator, said structure further including provisions for subdividing inert gas passing from said low temperature evaporator into a plurality of streams of which one flows through said higher temperature evaporator and connections for effecting circulation of inert gas through said low temperature evaporator at a rate which is always greater than that effected through said higher temperature evaporator.

3. Refrigeration apparatus employing evaporation of refrigerant fluid in the presence of inert gas including an upper, intermediate and lower evaporators in which said evaporation may take place, said evaporators being connected for circulation of inert gas therethrough so that evaporation of refrigerant fluid takes place at a low temperature in said intermediate evaporator and at higher temperatures in said upper and lower evaporators, and means embodied in said apparatus for regulating the circulation of inert gas through said lower evaporator relative to the circulation of inert gas through said intermediate evaporator responsive to change in load on said lower evaporator, said last-mentioned means including provisions for subdividing the inert gas passing from said intermediate evaporator into a plurality of gas streams of which one flows through said lower evaporator and connections for effecting circulation of inert gas through said intermediate evaporator at a rate which is always greater than that effected through said upper and lower evaporators.

4. An absorption refrigeration system employing evaporation of refrigerant fluid in the presence of inert gas which comprises a circuit for circulation of such gas including a first evaporator as one level and a second evaporator at a lower level, means for conducting refrigerant fluid successively through said first and second evaporators, said evaporators being connected in said circuit for circulation of inert gas serially through said first and second evaporators, and means responsive to the differential between flow of refrigerant fluid into said second evaporator and evaporation of such fluid therein for changing the rate of gas circulation in said second evaporator, said last-mentioned means including provisions for subdividing the inert gas passing from said first evaporator into a plurality of gas streams of which one flows through said second evaporator.

5. Absorption refrigeration apparatus employing evaporation of refrigerant fluid in the presence of inert gas including a circuit for circulation of such gas comprising an upper, intermediate and lower cooling elements in which said evaporation may take place, said cooling elements being connected in said circuit for flow of inert gas through said intermediate cooling element and from the latter through said lower and upper cooling elements so that evaporation of refrigerant fluid takes place at a low temperature in said intermediate cooling element and at higher temperatures in said lower and upper cooling elements, and connections in said circuit having throttling means disposed therein for effecting circulation of inert gas through said intermediate cooling element at a rate which is always greater than that at which circulation of inert gas is effected through said upper and lower cooling elements.

6. Absorption refrigeration apparatus employing evaporation of refrigerant fluid in the presence of inert gas including a circuit for circulation of such gas comprising evaporating means having an upper, intermediate and lower cooling elements in which said evaporation may take place, said cooling elements being connected in said circuit for flow of inert gas through said intermediate cooling element and from the latter through said lower and upper cooling elements so that evaporation of refrigerant fluid takes place at a low temperature in said intermediate cooling element and at higher temperatures in said lower and upper cooling elements, and regulating means for controlling the relative quantities of inert gas circulated through at least two of said cooling elements including provisions for a liquid seal arranged to receive unevaporated refrigerant fluid from said evaporating means at a rate dependent upon the circulation of inert gas in at least one of said cooling elements, said regulating means further including connections in said circuit for effecting circulation of inert gas through said intermediate cooling element at a rate which is always greater than that at which circulation of inert gas is effected through said lower and upper cooling elements.

7. Absorption refrigeration apparatus employing evaporation of refrigerant fluid in the presence of inert gas including a circuit for circulation of such gas comprising an upper, intermediate and lower cooling elements in which said evaporation may take place, said cooling elements being connected in said circuit for flow of inert gas through said intermediate cooling element and from the latter through said lower and upper cooling elements so that evaporation of refrigerant fluid takes place at a low temperature in said intermediate cooling element and at higher temperatures in said lower and upper cooling elements, and regulating structure for controlling the relative quantities of inert gas circulated through at least two of said cooling elements and for effecting circulation of such gas through said intermediate cooling element at a rate which is always greater than that at which circulation of gas is effected through said lower and upper cooling elements, said regulating structure comprising a by-pass connected in parallel with said lower cooling element which includes a chamber arranged to receive and hold unevaporated refrigerant fluid from said lower cooling element, said by-pass opening and closing responsive to change of liquid level in said chamber.

8. Absorption refrigeration apparatus as set forth in claim 7 in which said by-pass includes one or more conduits depending downwardly into said chamber whose lower ends terminate in openings inclined to the horizontal.

9. Absorption refrigeration apparatus employing evaporation of refrigerant fluid in the presence of inert gas including a circuit for circulation of such gas comprising an upper, intermediate and lower cooling elements in which said evaporation may take place, said cooling elements being connected in said circuit for flow of inert gas through said intermediate cooling element and from the latter through said lower and upper cooling elements so that evaporation of refrigerant fluid takes place at a low temperature in said intermediate cooling element and at higher temperatures in said lower and upper cooling elements, and regulating structure for controlling the relative quantities of inert gas circulated through at least two of said cooling elements and for effecting circulation of such gas through said intermediate cooling element at a rate which is always greater than that at which circulation of gas is effected through said lower and upper cooling elements, said regulating structure comprising a by-pass including valve means connected in parallel with said lower cooling element, and means to control the valve means in such by-pass responsive to changes in the amount of refrigerant fluid evaporated in said lower cooling element.

10. Absorption refrigeration apparatus employing evaporation of refrigerant fluid in the presence of inert gas including a circuit for circulation of such gas comprising an upper, intermediate and lower cooling elements in which said evaporation may take place, said cooling elements being connected in said circuit for flow of inert gas through said intermediate cooling element and from the latter through said lower and upper cooling elements so that evaporation of refrigerant fluid takes place at a low temperature in said intermediate cooling element and at higher temperatures in said lower and upper cooling elements, and regulating structure for controlling the relative quantities of inert gas circulated through at least two of said cooling elements and for effecting circulation of such gas through said intermediate cooling element at a rate which is greater than that at which circulation of gas is effected through said lower and upper cooling elements, said regulating structure including a by-pass connected in parallel with said lower cooling element, and means to control such by-pass responsive to changes in the amount of refrigerant fluid evaporated in such lower cooling element, said by-pass having provisions for effecting flow therethrough of a relatively small quantity of inert gas even when rendered operable to cause flow of inert gas primarily through said lower cooling element.

11. Absorption refrigeration apparatus employing evaporation of refrigerant fluid in the presence of inert gas including a circuit for circulation of such gas comprising an upper, intermediate and lower cooling elements in which such evaporation may take place, said circuit including a gas heat exchanger providing different spaces for flow of inert gas toward and from said cooling elements, respectively, said cooling elements being connected in said circuit for flow of inert gas through said intermediate cooling element and from the latter through said lower and upper cooling elements, and means including connections in said circuit for effecting circulation of inert gas through said intermediate cooling element at a rate which is greater than that at which circulation of inert gas is effected through said lower and upper cooling elements, said last-mentioned connections including provisions for connecting the outlets of the upper, intermediate and lower cooling elements with one of the gas heat exchanger spaces at spaced apart points so that enriched inert gas from each cooling element enters a region of said gas heat exchanger which is at a temperature substantially corresponding to the entering enriched inert gas.

12. Absorption refrigeration apparatus employing evaporation of refrigerant fluid in the presence of inert gas including a circuit for circulation of such gas comprising an upper, intermediate and lower cooling elements in which said evaporation may take place, and a gas heat exchanger providing different spaces for flow of inert gas toward and from said intermediate cooling element, said cooling elements being connected in said circuit for flow of inert gas through said intermediate cooling element and from the latter through said lower and upper cooling elements, and means including connections in said circuit for effecting circulation of inert gas through said intermediate cooling element at a rate which is greater than that of the circulation effected through said upper and lower cooling elements, said last-mentioned connections including a separate conduit means in thermal relation with said gas heat exchanger for conducting enriched inert gas from said lower cooling element.

13. Absorption refrigeration apparatus as set forth in claim 12 in which the connection for conducting enriched inert gas from said upper cooling element includes conduit means communicating with the conduit means for conducting enriched inert gas from said lower cooling element.

14. Absorption refrigeration apparatus employing evaporation of refrigerant fluid in the presence of inert gas including a circuit for circulation of such gas comprising an absorber, a gas heat exchanger and upper, intermediate and lower cooling elements in which said evaporation may take place, said cooling elements being connected in said circuit for flow of gas through said intermediate cooling element and from the latter through said upper and lower cooling elements, and means including connections in said circuit for effecting circulation of inert gas through said intermediate cooling element at a rate which is greater than that of the circulation effected through said lower and upper cooling elements, said last-mentioned connections including provisions for conducting enriched inert gas from said upper and lower cooling elements to said absorber including common conduit means and provisions for conducting enriched inert gas from said intermediate cooling element to said absorber including said gas heat exchanger.

15. Absorption refrigeration apparatus employing evaporation of refrigerant fluid in the presence of inert gas including a condenser, a circuit for circulation of such gas comprising an absorber and upper, intermediate and lower cooling elements in which said evaporation may take place, a pressure vessel communicating with the outlet end of said condenser, a vent conduit from said pressure vessel to said absorber, said cooling elements being connected in said circuit for flow of inert gas through said intermediate cooling element and from the latter through said lower and upper cooling elements, and means including connections for circulation of inert gas through said intermediate cooling element at a rate which is greater than that of the circulation effected through said lower and upper cooling elements, said last-mentioned connections including provisions for flowing inert gas between said upper cooling element and said absorber which includes said vent conduit.

16. Absorption refrigeration apparatus as set forth in claim 15 in which said vent conduit also serves to connect said lower cooling element and said absorber.

17. Absorption refrigeration apparatus employing evaporation of refrigerant fluid in the presence of inert gas including a rectifier, a condenser, a circuit for circulation of inert gas comprising an absorber and upper, intermediate and lower cooling elements in which said evaporation may take place, said cooling elements being connected in said circuit for flow of inert gas through said intermediate cooling element and from the latter through said lower and upper cooling elements, and means including connections in said inert gas circuit for effecting flow of inert gas through said intermediate cooling element at a rate which is greater than that of the circulation effected through said lower and upper cooling elements, a pressure vessel communicating with the outlet end of said condenser, a vent conduit from said pressure vessel to said absorber, said inert gas connections including said vent conduit which provides a path of flow for inert gas between said upper cooling element and said absorber, and a U-shaped conduit interconnecting said rectifier and said vent conduit for draining condensate from said rectifier into said vent conduit for flow to said absorber.

18. Refrigeration apparatus employing evaporation of refrigerant fluid in the presence of an inert gas which comprises an inert gas circuit having evaporating means including first and second evaporators in which said evaporation may take place and through which inert gas flows serially so that evaporation of fluid takes place at a higher temperature in said second evaporator than in said first evaporator, said first evaporator being at one level and said second evaporator at a lower level, means for conducting refrigerant fluid to said evaporators for gravity flow therethrough, said second evaporator being connected to receive liquid refrigerant only from said first evaporator, and regulating means embodied in said gas circuit for increasing and decreasing the circulation of inert gas through said second evaporator relative to the circulation of inert gas through said first evaporator responsive to increase and decrease, respectively, of unevaporated refrigerant fluid passing from said evaporating means, said regulating means including provisions for subdividing inert gas passing from said first evaporator into a plurality of streams of which one flows through said second evaporator and connections for effecting circulation of inert gas through said first evaporator at a rate which is always greater than that effected through said second evaporator.

SIGURD MATTIAS BÄCKSTRÖM.

References Cited in the file of this patent

UNITED STATES PATENTS

| Number | Name | Date |
|---|---|---|
| 2,059,877 | Kogel | Nov. 3, 1936 |
| 2,167,697 | Thomas | Aug. 1, 1939 |
| 2,194,505 | Kogel et al. | Mar. 26, 1940 |
| 2,210,609 | Ullstrand | Aug. 6, 1940 |
| 2,267,283 | Lenning | Dec. 23, 1941 |
| 2,269,701 | Ullstrand | Jan. 13, 1942 |
| 2,363,399 | Coons | Nov. 21, 1944 |
| 2,377,051 | Sutton | May 29, 1945 |